(12) United States Patent
Hojjatie et al.

(10) Patent No.: US 12,030,827 B2
(45) Date of Patent: Jul. 9, 2024

(54) LIQUID FERTILIZER COMPRISING THIOSULFATE

(71) Applicant: Tessenderlo Kerley, Inc., Phoenix, AZ (US)

(72) Inventors: Michael Massoud Hojjatie, Tucson, AZ (US); Constance Lynn Frank Lockhart, Tucson, AZ (US); Thomas Fairweather, Dundee, OR (US); Terry Ludwig, Phoenix, AZ (US)

(73) Assignee: Tessenderlo Kerley, Inc., Phoenix, AZ (US)

( * ) Notice: Subject to any disclaimer, the term of this patent is extended or adjusted under 35 U.S.C. 154(b) by 491 days.

(21) Appl. No.: 17/266,589

(22) PCT Filed: Jul. 9, 2019

(86) PCT No.: PCT/US2019/041074
§ 371 (c)(1),
(2) Date: Feb. 6, 2021

(87) PCT Pub. No.: WO2020/033094
PCT Pub. Date: Feb. 13, 2020

(65) Prior Publication Data
US 2021/0309584 A1 Oct. 7, 2021

Related U.S. Application Data

(60) Provisional application No. 62/715,350, filed on Aug. 7, 2018.

(51) Int. Cl.
| | |
|---|---|
| C05G 5/20 | (2020.01) |
| C05C 3/00 | (2006.01) |
| C05C 9/00 | (2006.01) |
| C05G 1/00 | (2006.01) |
| C05G 5/23 | (2020.01) |

(52) U.S. Cl.
CPC ............... *C05G 5/20* (2020.02); *C05C 3/005* (2013.01); *C05C 9/00* (2013.01); *C05C 9/005* (2013.01); *C05G 1/00* (2013.01); *C05G 5/23* (2020.02)

(58) Field of Classification Search
None
See application file for complete search history.

(56) References Cited

U.S. PATENT DOCUMENTS

| | | | |
|---|---|---|---|
| 4,191,550 A | 3/1980 | Hawkins et al. | |
| 4,210,437 A * | 7/1980 | Windgassen | C05C 3/00 71/64.1 |
| 4,239,522 A | 12/1980 | Wilson et al. | |
| 4,356,021 A * | 10/1982 | Kenton | C05G 5/27 71/30 |
| 5,082,487 A | 1/1992 | Mayer | |
| 10,508,060 B1 * | 12/2019 | Roach | C05F 11/00 |
| 2004/0035162 A1 * | 2/2004 | Williams | C05D 9/00 71/28 |
| 2012/0255335 A1 * | 10/2012 | Fairweather | C05D 1/00 71/61 |
| 2017/0101349 A1 * | 4/2017 | Blankenburg | C05G 5/23 |

FOREIGN PATENT DOCUMENTS

| | | | | |
|---|---|---|---|---|
| CN | 106380302 A * | 2/2017 | | C05G 3/00 |
| WO | 2011/015306 A2 | 2/2011 | | |

OTHER PUBLICATIONS

PCT International Search Report and Written Opinion for PCT/US2019/041074, dated Oct. 24, 2019, 12 pages.
Machine Translation into English of WO2011/015306.

* cited by examiner

*Primary Examiner* — Wayne A Langel
(74) *Attorney, Agent, or Firm* — N.V. Nederlandsch Octrooibureau

(57) ABSTRACT

The present invention relates to an aqueous liquid fertilizer composition having a 4 wt % to 30 wt % nitrogen content and 8 wt % to 27 wt % sulfur content comprising more than 20 wt % ammonium thiosulfate, calculated as dry matter, and at least 2 wt %, calculated as dry matter, of one other compound selected from the group consisting of a sulfite, bisulfite, urea-triazone compound and zinc sulfate hexahydrate or mixtures thereof, wherein the composition has a salt out temperature of about 0 C or less as measured with the FFF-method. The aqueous liquid fertilizer composition of the present invention can have an amount of sulfur of about 21 wt % or higher, for example 22-26 wt %.

15 Claims, No Drawings

LIQUID FERTILIZER COMPRISING THIOSULFATE

CROSS-REFERENCE TO RELATED APPLICATION

This application is the U.S. national state of PCT/2019/041074 filed Jul. 9, 2019, and claims priority to U.S. provisional application No. 62/715,350 filed on Aug. 7, 2018, both of which are hereby incorporated herein by reference for all that they disclose.

The present invention relates to liquid fertilizers comprising thiosulfate.

BACKGROUND

Liquid fertilizers are common, and used in fertigation, foliar application and the like. As crops need nitrogen, potassium, phosphorus, sulfur as main elements, these are common components of liquid fertilizers. Nitrogen is often supplied as urea/ammonium nitrate solution (UAN), and UAN is supplied in different strength, being a 28 wt % N (UAN28) (30 wt % water, 40 wt % ammonium nitrate and 30 wt % urea) up to 32 wt % N (UAN32) (20 wt % water, 45 wt % ammonium nitrate and 35 wt % urea). The main reason for these different strengths is the salt out temperature (SOT), the temperature at which solid particles start to emerge generally due to crystallization. In areas where lower temperatures are experienced, like northern part of the USA and Canada, UAN28 is used, while in the Southern states, UAN32 is used.

To reduce costs of transport, with liquid fertilizer, it is preferred to have the least amount of water possible, and higher strength is a general aim.

Sulfur is becoming an increasingly necessary component in fertilizers for crop production. The most common liquid fertilizer with high concentration of sulfur is ammonium thiosulfate. An ammonium thiosulfate solution of about 57 wt % of ATS has about 26 wt % sulfur. Half of the sulfur is readily available as sulfate ($SO_4^{-2}$), while the other half is available as sulfide, which is oxidized during some period, and acts as slow release source of sulfur. An ammonium thiosulfate solution has a drawback of salting out at temperatures around 7° C. In particular in northern states of the USA and in Canada, storage during winter requires that liquid fertilizers do not salt out, e.g. at about −8° C. or lower.

Several liquid fertilizers with sulfur are described, with relatively low salt out temperature.

U.S. Pat. No. 4,239,522 describes mixtures of ammonium sulfate, UAN 32 (a mixture of urea, ammonium nitrate and water with 32% N), and water. A salt-out temperature of about −27° C. is reported for a composition comprising about 16% N and about 8.8% S. The composition comprises relatively high amount of water (about 49%), which is a disadvantage.

U.S. Pat. No. 5,082,487 describes compositions with ammonium sulfate in combination with urea and water. A preferred composition comprises about 24% N and about 3.5% S with a reported salt out temperature of about −18° C. A composition with 6.5% S was reported to have a salt out temperature of about 0° C., and was considered not acceptable in that respect. Hence, this technology allows only very low amounts of S in the liquid fertilizer having a low salt out temperature, which is a disadvantage.

Another disclosure which describes a relatively low S comprising composition is WO2011/015306. According to this reference, mixtures are prepared from 28-30% ammonium nitrate, 22-28% urea, 8-9% ammonium sulfate, 7-10% ammonium thiosulfate and water to make up to 100%. Low salt-out temperatures (about −15° C.) are reported with about 24-26% N and about 3-6% S.

US2017/101349 describes mixtures of ammonium thiosulfate with a number of other compounds like potassium thiosulfate, or metal-EDTA complexes, diluted with water, wherein the metal can be Zn, Fe, or Cu to lower the salt-out temperature. These compositions have very low N, which is a disadvantage.

Further, a product is available with 15% N and 20% S, being a mixture of about 45% ammonium thiosulfate, about 38% water, about 9% ammonium nitrate and about 7% urea, and this product has a reported salt out temperature of about −32° C.

The crystallization temperature or salt out temperature is not well defined in industry. The more common method is to slowly cool a composition, and determine at what temperature crystals appear. Unfortunately, this method is relatively inaccurate, as most compositions show supercooling effects and the crystallization temperature depends to a certain extent on the crystal-initiation points. A better method is a variant on the cooling method, but a porous boiling chip is added which acts as a nucleation site. In this way, the cooling method is more repeatable and reliable. Yet, relatively low values are reported using this method in comparison with the following method. A further method is one which is suggested by the Fluid Fertilizer Foundation, and comprises the steps to first cool a composition to clearly below the salt-out temperature, and then to increase the temperature by removing the cooling source to determine when the last crystals dissolve (the FFF-method). With the FFF-method relatively high salt out temperatures are found. For example, the salt out temperature of the 15-0-0-20S composition described in the former paragraph is about −15° C. with the FFF-method (instead of about −32° C. as reported in the literature).

The object of the invention to provide a high strength sulfur containing liquid fertilizer with low salt out temperature. More in particular, the present invention provides for compositions that need less water to achieve acceptable salt-out temperature, and thereby allowing higher N+S content or other useful compounds.

SUMMARY OF THE INVENTION

The above objective is solved with the present invention relating to an aqueous liquid fertilizer composition having a 4 wt % to about 30 wt % nitrogen content and a 8 wt % to about 27 wt % sulfur content, comprising more than about 20 wt % ammonium thiosulfate, calculated as dry matter, and at least about 2 wt %, calculated as dry matter, of one other compound selected from the group consisting of a sulfite, bisulfite, urea-triazone compound, zinc sulfate heptahydrate or mixtures thereof, wherein the composition has a salt out temperature of about 0° C. or less.

The composition of the present invention allows salt out temperatures below about −5° C., for example about −20 to about −10° C. The aqueous liquid fertilizer composition of the present invention can have an amount of sulfur of about 21 wt % or higher, like about 22-26 wt %.

The invention further relates to a mixture of the aqueous liquid fertilizer composition according to the invention and an UAN liquid fertilizer composition in a ratio of between about 10-60 wt % fertilizer composition according to the invention and about 90-40 wt % of UAN liquid fertilizer composition.

DETAILED DESCRIPTION

The present invention relates to an aqueous liquid fertilizer composition having a 4 wt % to about 30 wt % nitrogen content and 8 wt % to about 27 wt % sulfur content, comprising more than about 20 wt % ammonium thiosulfate, calculated as dry matter, and at least about 2 wt %, calculated as dry matter, of one other compound selected from sulfite and/or bisulfite and/or urea-triazone and/or zinc sulfate heptahydrate compound, wherein the composition has a salt out temperature of about 0° C. or less.

Preferably, the salt out temperature is about −2° C. or less, more preferably about −5° C. or less, and more preferably, the salt out temp is between about −25° C. and about −5° C., and most preferably between about −22° C. and about −6° C.

The amount of sulfur preferably is about 9 wt % or higher, more preferably about 12 wt % or higher in the liquid fertilizer composition.

In one preferred embodiment, the aqueous liquid fertilizer composition according to the invention has an amount of sulfur of about 21 wt % or higher. The commonly used UAN/ATS mixtures have an amount of S of about 20 wt % or lower. Therefore, it is an advantage that with the composition of this invention, it is possible to achieve higher S values.

In another embodiment, the aqueous liquid fertilizer composition according to the invention has a sulfur content between about 18 wt % and about 27 wt % sulfur, preferably between about 20 wt % and about 26 wt % sulfur, and more preferably between about 21 wt % and about 26 wt % sulfur, and most preferably about 22 wt % or higher.

In a further embodiment, the aqueous liquid fertilizer composition according to the invention has a nitrogen content of between about 8 wt % and about 14 wt %, preferably between about 10 wt % to about 12 wt % nitrogen, more preferably between about 10.5 wt % and about 11.5 wt % nitrogen.

In a further embodiment, the liquid fertilizer composition according to the invention has a zinc content of between about 0.1 and about 4 wt %, preferably about 0.5-2 wt %. The amount of zinc in zinc sulfate hexahydrate is about 25 wt %, hence the amount of zinc sulfate hexahydrate preferably is about 0.4 to about 16 wt %, preferably about 2-8 wt %.

Preferably, the aqueous liquid fertilizer composition according to the invention comprises about 30 wt % or more ammonium thiosulfate, calculated as dry matter relative to the liquid fertilizer composition, more preferably about 40 wt % or more and even more preferably about 43 wt % or more. Generally, the amount will be about 57 wt % or less, like about 53 wt % or less. Generally, the amount of ammonium thiosulfate, calculated as dry matter relative to the liquid fertilizer composition will be between about 20 wt % and about 57 wt %, preferably between about 30 and about 55%.

In one embodiment, the aqueous liquid fertilizer composition according to the invention comprises about 25 to about 70 wt % water, preferably about 25 to about 60 wt % water. The amount of water is defined as relative to the total composition. In the more preferred embodiment, the amount of water is less than about 50 wt % of the total composition, even more preferably less than about 45 wt % water.

In one preferred embodiment, the aqueous liquid fertilizer composition according to the invention further comprises ammonium bisulfite and/or ammonium sulfite, and preferably mixtures of these.

In another preferred embodiment of the composition according to the invention, the composition comprises potassium bisulfite and/or potassium sulfite. The use of potassium (bi)sulfite allows an amount of K in the liquid fertilizer up to for example about 5% potassium (as $K_2O$). If potassium (bi)sulfite is used, the amount of K (measured as $K_2O$) preferably is about 1-5 wt %, preferably about 2-5 wt %.

The pH of the composition of the present invention generally will be between about 5 and about 8, preferably between about 5 and about 7. Sulfite/bisulfite composition will be pH dependent and their ratio will depend on the specific pH of solution.

In another embodiment of the invention, the aqueous liquid fertilizer composition comprises a urea triazone compound.

In another embodiment of the invention, the aqueous liquid fertilizer composition comprises zinc sulfate heptahydrate. This zinc compound dissolves reasonably in the liquid fertilizer, without the need for chelating agents, while (further) lowering the SOT. The sulfate part of the zinc sulfate heptahydrate increases the S content of the liquid fertilizer.

In a preferred embodiment of the invention, the amount of ammonium or potassium (bi)sulfite and/or triazone and/or zinc sulfate heptahydrate is about 3 wt % or more, preferably about 5 wt % or more. Generally, the amount will be about 20 wt % or less, preferably about 15 wt % or less, all calculated as dry matter.

The composition of the invention allows achieving a low salt out temperature, while having a very high S content. In order to achieve this low salt out temperature, use of UAN is not necessary. Other proposed compositions having S with low salt out temperature, while not using UAN, achieved only low S, such as below about 6%. Hence, the various combinations of the low salt-out temperature as defined above, for example about −5° C. or below, combined with a high S content such as about 20 wt % or more, preferably about 21 wt % or more, is specifically disclosed herewith.

The composition invention preferably relates to an aqueous liquid fertilizer composition having a 4 wt % to about 30 wt % nitrogen content and a 8 wt % to about 27 wt % sulfur content consisting essentially of more than about 20 wt % ammonium thiosulfate, calculated as dry matter, and at least about 2 wt %, calculated as dry matter, of one other compound selected from sulfite and/or bisulfite and/or urea-triazone compound and/or zinc sulfate heptahydrate, wherein the composition has a salt out temperature of about 0° C. or less. Consisting essentially of means in this context that the composition does contain other compounds in an amount of less than about 1 wt %, preferably less than about 0.5 wt %, and more preferably less than about 0.1 wt %.

The composition of the present invention can be used by a farmer in combination with UAN, and still achieve low salt out temperature with the mixture, even if UAN32 is used.

In a preferred embodiment, the present invention provides for a mixture of the aqueous liquid fertilizer composition as described above, and UAN liquid fertilizer composition in a ratio of between about 10-60 wt % fertilizer composition according to the invention and about 90-40 wt % of UAN liquid fertilizer composition.

Preferably, the mixture comprises an UAN grade between about UAN28 and UAN32.

The crystallization temperature or salt out temperature is measured according to the FFF-method, wherein a composition is first cooled to clearly below the salt-out temperature, and then the temperature is increased by removing the cooling source to determine when the last crystals dissolve.

EXAMPLES

Measurement Methods:

The salt out temperature (SOT) can be determined in several ways. A cooling method with crystal initiation chip was used (denoted as CC-method) for comparison. The method which is used in accordance with the invention is as described in the FFF Manual, Vol. 2, 1994m (FFF-method; FFF being the abbreviation of the Fluid Fertilizer Foundation).

CC-method: 10 ml of a sample is provided in a test bottle. A porous boiling chip is added to the bottle to act as a nucleation site for solid formation. Starting at 0° C., temperature is reduced slowly to −35° C. to observe salting out from the direction of solid formation.

FFF-method: The Salt-Out Temperature (SOT) is determined from the reverse direction. 20-25 ml of a liquid in a test tube, while stirring, is cooled in an isopropanol-dry ice bath until all the liquid is frozen. The cooling source is removed and the test tube is allowed to warm up to room temperature by natural convection. The SOT is measured as when the last crystal dissolves.

The pH was measured with a usual pH measuring device.

Comparative Experiments A

Several 15-0-0-20S blends were prepared using ATS and UAN liquid fertilizers. ATS, obtained from Tessenderlo Kerley Inc. was mixed with either UAN 28 or UAN 32. Mixtures were prepared by mixing 155 pbw ATS/35 pbw UAN32 and 9pbw water resp., 155 pbw ATS, 40 pbw UAN28 and 4 pbw water. Further, a commercial product was obtained and measured. The latter solution consists of 41-50% ATS (as dry matter relative to the solution), 32-45% water, 8-10% ammonium nitrate (AN), 6-8% urea (U) according to the spec. Furthermore, the salt out temperature of UAN28 and UAN32 were measured.

The SOT was measured according to the CC-method and the FFF method. Results are outlined in Table 1.

TABLE 1

| Compound | Composition in wt % | SOT FFF-method |
| --- | --- | --- |
| ATS (12-0-0-26S) liquid fertilizer | 57% ATS in 43% water | 7° C. |
| ATS/UAN 32 (15-0-0-20S); | 44% ATS, 14% U/AN 42% water | −15° C.* |

TABLE 1-continued

| Compound | Composition in wt % | SOT FFF-method |
| --- | --- | --- |
| ATS/UAN 28 (15-0-0-20S); | 44% ATS, 14% U/AN 42% water | −16° C. |
| Commercial 15-0-0-20S | 43% ATS, 41% water, 9% AN, 7% U | −15° C. |
| Commercial UAN28 | 40 wt % AN, 30 wt % U, 30 wt % water | −18° C. (method not indicated) |
| Commercial UAN32 | 45 wt % AN 35 wt % U, 20 wt % water | 0° C. (method not indicated) |

*The 15-0-0-20S compositions exhibited a SOT of about −32° C. if measured with the CC method.

Comparative Experiment B

A mixture was prepared with 10 wt % ATS liquid fertilizer and 90 wt % UAN 28, resulting in a nutrient blend of 26-0-0-2.6S with 5.7 wt % ammonium thiosulfate, 36 wt % urea, 27 wt % ammonium nitrate and 31 wt % of water. The SOT according to the CC method was −29° C., according the FFF-method, −15° C.

Examples 1-5

Several blends were prepared with ATS liquid fertilizer from Tessenderlo Kerley Inc. with 57 wt % active ingredient, and an ammonium sulfite/ammonium bisulfite liquid fertilizer with 65 wt % active ingredient. The specifics are given in Table 2.

TABLE 2

| Compound | Example 1 | Example 2 | Example 3 | Example 4 | Example 5 |
| --- | --- | --- | --- | --- | --- |
| ABS liquid (gm) | 9.5 | 2.6 | 4.7 | 9.0 | 6.5 |
| ATS liquid (gm) | 38.0 | 44.9 | 43.2 | 36.0 | 39.0 |
| Additional water (gm) | 2.5 | 2.5 | 2.2 | 5.0 | 4.7 |
| ABS gm (wt %) | 6.1 (12.2%) | 1.7 (3.3%) | 3.0 (6.0%) | 5.8 (11.6%) | 4.2 (8.3%) |
| ATS gm (wt %) | 21.5 (43.1%) | 25.4 (50.9%) | 24.5 (48.9%) | 20.4 (40.8%) | 22.1 (44.0%) |
| Water gm (wt %) | 22.4 (44.7%) | 22.9 (45.8%) | 22.6 (45.1%) | 23.8 (47.6) | 23.9 (47.6%) |
| N—P—K—S | 11-0-0-24.4S | 11-0-0-24.4S | 10.2-0-0-22.9 | 10.4-0-0-23.1 | 10.5-0-0-23.3S |
| SOT (FFF method) | −11.5° C. | −6.0°C | −−6.5° C. | −19.0° C. | −14° C. |

Table 2 shows that high strength liquid fertilizers can be obtained with an S content of about 22 or higher, while having an acceptable (about −6° C.) to very good (about −10 to about −20° C.) salt out temperature.

Examples 6-8

A further blend was prepared (as example 6) analogous to examples 1-5, as shown below in table 3. This blend of example 6 was further mixed with UAN32. UAN32 has a SOT around 0° C. (-method not indicated). The blends of examples 7 and 8 provide high strength N combined with useful S, while having only 25-30% water. These examples 7 and 8 reflect what is commonly done by either wholesalers or farmers themselves, who—depending on the specific need for S an N—, blend a thiosulfate based fertilizer with UAN liquid fertilizer to provide cost effective N combined with S. Specifics and results are given in Table 3.

TABLE 3

| Compound | Example 6 | Example 7* | Example 8* |
| --- | --- | --- | --- |
| ABS liquid | 19 | 16.6% | 41.6% |
| ATS liquid | 75 | | |
| Additional water | 6 | | |

TABLE 3-continued

| Compound | Example 6 | Example 7* | Example 8* |
|---|---|---|---|
| UAN32 | — | 81.7% | 58.4% |
| Additional water | — | 1.6% | — |
| ABS gm/% | 12.2 (12.2%) | 2.0% | 5.1% |
| ATS gm/% | 42.5 (42.5%) | 7.1% | 17.7% |
| Water gm/% | 45.3 (45.3%) | 25.5% | 30.5% |
| UAN %+ | — | 65.4% | 46.7% |
| N—P—K—S | 10.8-0-0-23.3 | 27.5-0-0-3.9S | 23.2-0-0-9.7S |
| SOT (FFF method) | −11.5° C. | −7° C. | −11° C. |

*Blend was slightly cloudy
+UAN 32 water content is approximately 20 wt %

Examples 9-10

Blends were prepared from ATS liquid fertilizer and TRISERT-NB, a liquid fertilizer comprising urea and triazone commercially available from Tessenderlo Kerley Inc. Results are shown in Table 4.

TABLE 4

| Compound | Example 9<br>Blend (9) Composition | Example 10<br>Blend (10) Composition |
|---|---|---|
| ATS liquid | 95% | 85% |
| Trisert-NB | 5% | 15% |
| ATS (wt %) | 53.8 | 48.2 |
| Urea/triazone (wt %) | 4.6 | 13.8 |
| Water (wt %) | 41.6 | 38 |
| N—P—K—S | 12.4-0-0-24.4 | 13.8-0-0-21.8 |
| SOT (FFF method) | 0° C. | −13.5° C. |

These experiments show that also with triazone/urea comprising liquid fertilizer, high strength fertilizers with an amount of S more than 20 w % can be obtained, with a salt out temperature below about −10° C.

Example 11

To ATS liquid fertilizer, 4 wt % zinc sulfate hexahydrate was added, and stirred till clear. The amount of zinc was about 1 wt %. The SOT was lowered by about 18° C., to about −10° C.

The invention claimed is:

1. An aqueous liquid fertilizer composition having a 4 wt % to about 30 wt % nitrogen content and 8 wt % to about 27 wt % sulfur content comprising more than about 20 wt % ammonium thiosulfate, calculated as dry matter, and at least about 2 wt %, calculated as dry matter, of one other compound selected from the group consisting of a sulfite, bisulfite, urea-triazone compound and zinc sulfate hexahydrate or mixtures thereof, wherein the composition has a salt out temperature of about 0° C. or less as measured with the FFF-method.

2. The aqueous liquid fertilizer composition according to claim 1, wherein the salt out temp is about −2° C. or less.

3. The aqueous liquid fertilizer composition according to claim 2, wherein the salt out temp is between about −25° C. and about −5° C.

4. The aqueous liquid fertilizer composition according to claim 1, wherein the composition comprises about 25-70 wt % water.

5. The aqueous liquid fertilizer composition according to claim 4, wherein the composition comprise less than about 50 wt % water.

6. The aqueous liquid fertilizer composition according to claim 1, wherein the composition comprises ammonium bisulfite and/or ammonium sulfite.

7. The aqueous liquid fertilizer composition according to claim 6, wherein the composition comprises about 3-20 wt % of said compound or mixtures thereof, calculated as dry matter relative to the liquid fertilizer composition.

8. The aqueous liquid fertilizer composition according to claim 1, wherein the amount of sulfur is about 21 wt % or higher.

9. The aqueous liquid fertilizer composition according to claim 1, wherein the composition comprises about 30 wt % or more ammonium thiosulfate, calculated as dry matter in the liquid fertilizer composition.

10. The aqueous liquid fertilizer composition according to claim 1, wherein the composition has a nitrogen content of between about 9 wt % and about 14 wt % nitrogen.

11. The aqueous liquid fertilizer composition according to claim 1, wherein the composition has a sulfur content between about 18 wt % and about 27 wt % sulfur.

12. The aqueous liquid fertilizer composition according to claim 1, wherein the composition comprises potassium bisulfite and/or potassium sulfite.

13. The aqueous liquid fertilizer composition according to claim 1, wherein the composition comprises a urea triazone compound.

14. The aqueous liquid fertilizer composition according to claim 1, wherein the composition comprises zinc sulfate hexahydrate.

15. The aqueous liquid fertilizer composition according to claim 1, further comprising 90-40 wt % of a UAN liquid fertilizer.

* * * * *